United States Patent [19]

Pawloski

[11] Patent Number: 4,927,474
[45] Date of Patent: May 22, 1990

[54] PROCESS AND APPARATUS FOR SEALING THERMOPLASTIC PLIES IN LAMINATED SHEETS HAVING THICKENED SECTIONS

[75] Inventor: James C. Pawloski, Bay City, Mich.
[73] Assignee: The Dow Chemical Company, Midland, Mich.
[21] Appl. No.: 230,940
[22] Filed: Aug. 11, 1988
[51] Int. Cl.$^5$ .............................................. B32B 31/20
[52] U.S. Cl. ..................... 156/66; 156/289; 156/308.4; 156/498; 156/537; 156/583.4; 383/63; 383/107; 383/114; 493/190; 493/927
[58] Field of Search ............ 156/66, 289, 308.4, 156/498, 537, 583–584; 383/63, 107, 114; 493/190, 927

[56] References Cited

U.S. PATENT DOCUMENTS

| | | |
|---|---|---|
| 3,033,257 | 5/1962 | Weber. |
| 3,847,711 | 11/1974 | Howard .............................. 156/515 |
| 3,986,914 | 10/1976 | Howard .............................. 156/251 |
| 4,024,010 | 5/1977 | Boccia ................................ 156/290 |
| 4,304,615 | 12/1981 | Siegel ............................... 156/66 X |
| 4,658,433 | 4/1987 | Savicki ............................... 383/63 |

Primary Examiner—Robert A. Dawson

[57] ABSTRACT

A process and apparatus for sealing plies of thermoplastic material included in laminated sheets having thickened sections in a manner such that strong side seals result with substantially no delamination of one or more plies of a laminated sheet comprises performing a first blocking operation on the laminated sheets by application of heat and pressure through a first pair of seal bars having an effectively matched cross-section such that the laminated sheets remain substantially planar during the first blocking operation. A second blocking operation is performed over the previously blocked areas by the application of heat and a soft pressure through a second pair of seal bars having an effectively matched cross section such that the laminated sheets remain substantially planar during the second blocking operation. Finally, a cooling blocking operation is performed over the previously blocked areas by the pressure application of a pair of cooling bars having an effectively matched cross section such that the laminated sheets are maintained substantially planar during the cooling blocking operation. The first blocking operation is preferably performed at a temperature ranging from 140° to 175° C.

10 Claims, 3 Drawing Sheets

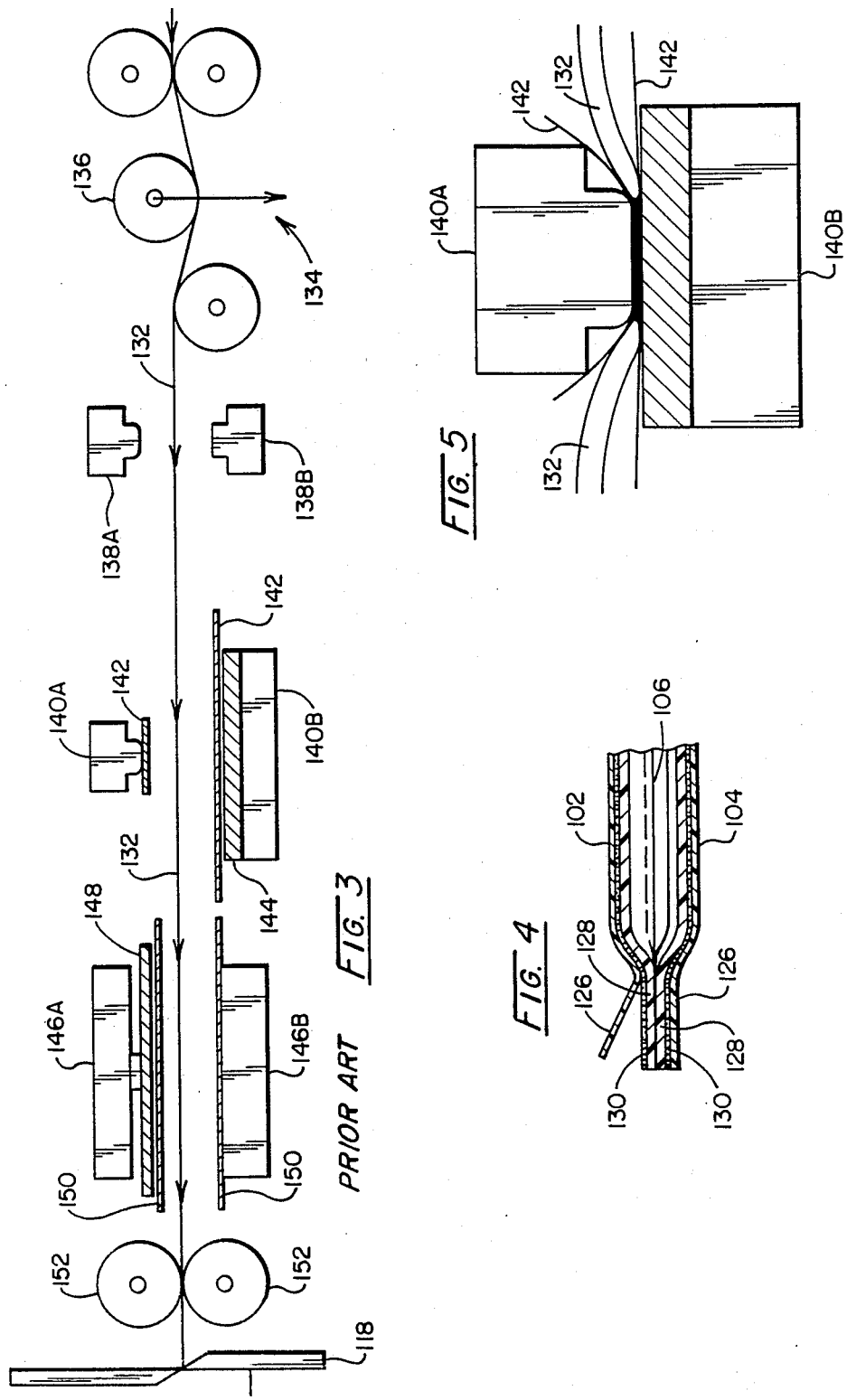

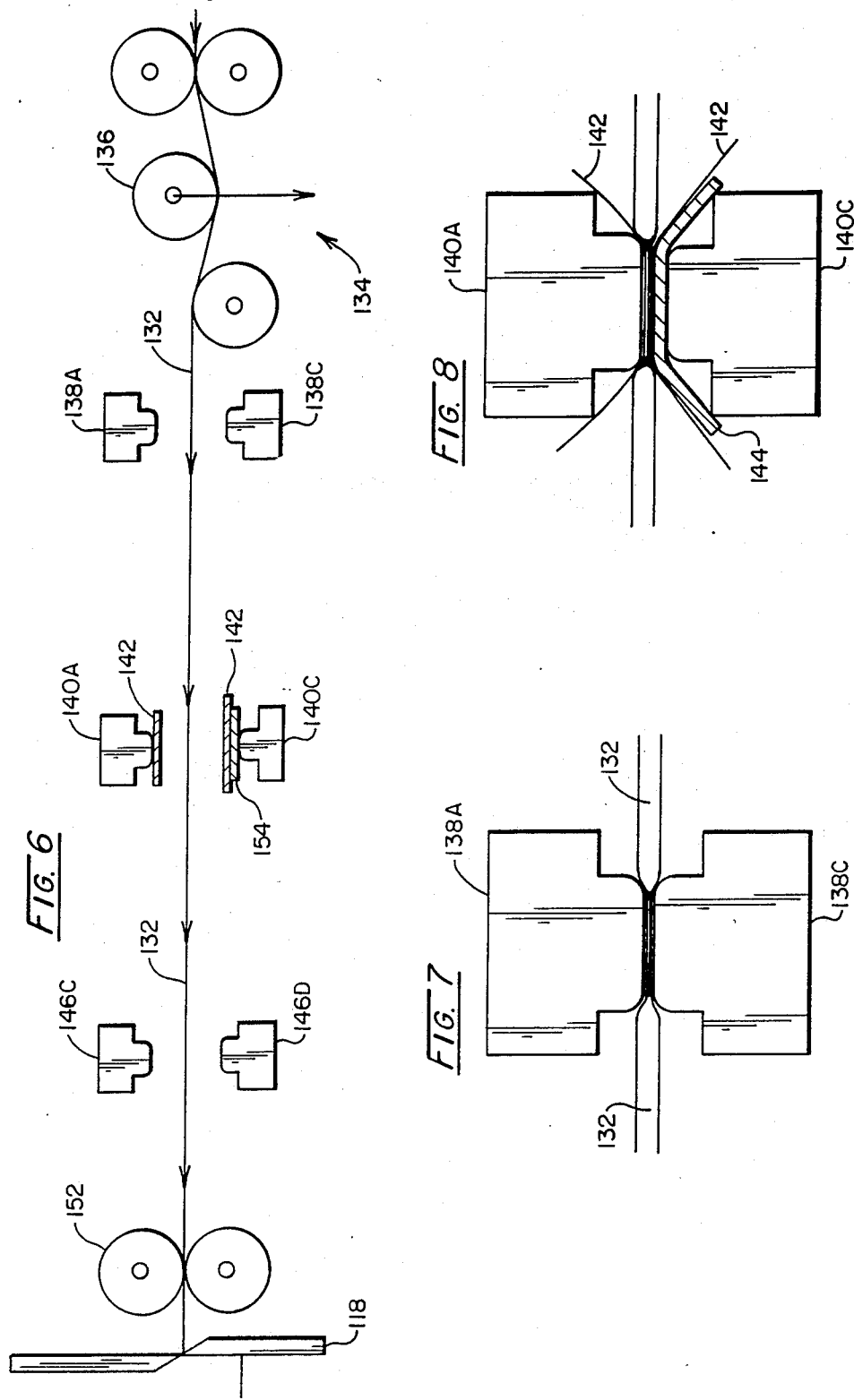

PROCESS AND APPARATUS FOR SEALING THERMOPLASTIC PLIES IN LAMINATED SHEETS HAVING THICKENED SECTIONS

BACKGROUND OF THE INVENTION

The present invention relates generally to the manufacture of plastic bags from laminated sheet material including plies of thermoplastic material and, more particularly, to a process and apparatus for sealing plies of thermoplastic material included in laminated sheets having thickened sections, such as zipper closures, during the manufacturing of such plastic bags.

The manufacture of plastic bags such as trash bags, folded sandwich bags and other nonzippered bags from uniform film stock has been perfected for many years. Such plastic bags have two generally parallel walls which are joined together at their respective mated sides and bottom edges to form a container for items to be held within the bag. The upper edges of the two walls adjacent one another are open to provide access to the bag. Quality seals are produced during the manufacture of these bags at high cycle rates by a variety of sealers of cutter/sealer devices due to the uniformity of thickness of the film stock used to form the bags.

As an improvement to such plastic bags, any one of a variety of openable and recloseable interlocking "zipper" closures may be fitted or integrally formed into the open ends of the bags. The provision of closure devices leads to difficulty in manufacturing the bags since the multiple plies of thermoplastic material then include portions of nonuniform thicknesses due to the closures which have substantially greater thickness than the remainder of the film. The thicker zippered closure portions of the bags require a sealing device to be operated at higher temperatures and lower cycle speeds in order to adequately seal those portions of the bags.

To add to the sealing difficulties for closeable plastic bags, flexible laminated sheet material may be used for their construction. For example, the bag may have walls of a laminated sheet material in order to protect electrostatically sensitive components from potentially damaging electrostatic charges. However, difficulties may arise from the potential for separation of the plies of the laminated sheet material due to the manufacturing process. But the integrity of such bags is important because it assures dissipation and/or shielding to protect against electrostatic charges. In addition, bags of this type have also been utilized in the medical and pharmaceutical industries for containing ultra clean instruments and drug substances. Again the integrity of such bags is important because the medical contents might otherwise be contaminated by dust and other airborne contaminants in the event of a build up of electrostatic charges on packaging materials.

During manufacturing operations, it was discovered that in plastic bags formed from laminated sheet materials, such as that utilized for electrostatic dissipative and/or shielding packages, weak side seals were developing, particularly around the zipper closure portions of the bags. To overcome these problems, higher temperatures and pressures were used in existing sealing equipment. While the use of higher temperatures and pressures added to the strength of side seals in the bags formed from laminated sheet material, it was discovered that the plies adjacent the zipper closure portions of the bags tended to delaminate from the other plies. Thus, when applying known techniques to improve seal strength, delamination problems arose which counteracted the improvements in seal strength.

Consequently, a need exists for improved sealing of the side seals of bags made from laminated sheet material having nonuniform thickness film stock, primarily film having thickened sections due to the presence of zipper closure portions, which sealing not only provides strong side seals to retain items contained within the bags but also forms the seals such that the plies of the laminated sheet material from which the bags are manufactured do not delaminate from one another, particularly around the zipper closure portions of the bags.

SUMMARY OF THE INVENTION

The present invention satisfies the foregoing need by means of a process and apparatus for sealing plies of thermoplastic material included in laminated sheets having thickened sections resulting from the presence of zipper closures to provide products with improved seals wherein delamination of the plies of the laminated sheet material is substantially reduced if not eliminated, particularly adjacent the zipper closure portions of the bags.

The process preferrably incorporates the following combination of operative steps: (a) performing a first blocking operation on the laminated sheets by the application of heat and pressure through a pair of seal bars configured to maintain the laminated sheets substantially planar during the first blocking operation, the bars engaging areas of the sheets to be sealed including zippered closure portions thereof to preliminarily seal the zippered closure portions and preblock the remainder of the areas; (b) performing a second blocking operation over the previously blocked areas of the laminated sheets by the application of heat and a soft pressure through a pair of seal bars configured to maintain the laminated sheets substantially planar during the second blocking operation to seal the remainder of the areas and secondarily seal the zipper closure portions; and (c) performing a final cooling blocking operation over the previously blocked areas of the laminated sheets by the pressure application of a pair of cooling bars configured to maintain the laminated sheets substantially planar during the cooling blocking operation. The first blocking operation is preferrably preformed at a temperature ranging from 140°–175° C.

It has been found that by using pairs of blocking bars which have an effectively matched cross section, the laminated sheets are maintained substantially planar during the blocking operations. The blocking bars for performing the second blocking operation may be rounded at their leading and trailing edges and at least one of the bars may be covered by a silicone sheet with the radii of the rounded leading and trailing edges of the bars and the thickness of he silicone sheet being coordinated such that the effective cross sections of the bars are matched. This is one arrangement for applying a soft pressure during the second blocking operation to seal the remainder of the areas of the laminated sheets and secondarily seal the zipper closure portions thereof.

Accordingly, it is an object of the present invention to provide a process and apparatus for sealing thermoplastic material included in laminated sheets having thickened sections resulting from the presence of zipper closures which produces reliable side edge seals and substantially reduces if not eliminates delamination of plies of the laminated sheets which are being sealed, particularly adjacent the zipper closures.

Other objects and advantages of the invention will be apparent from the following description, the accompanying drawings and the appended claims.

BRIEF DESCRIPTION OF THE DRAWINGS

FIG. 3 is a schematic side view of equipment originally used to seal plastic bags made from laminated sheet material;

FIG. 4 is a cross-section through the problem sealing area of the bag of FIG. 1 showing delamination of the laminated sheet material used to form the plastic bag;

FIG. 5 illustrates squeezing the zipper closure area of a bag by means of sealing bars including one flat bar;

FIG. 6 is a schematic side view of bag sealing equipment comparable to that shown in FIG. 3 but modified to operate in accordance with the present invention; and FIGS. 7 and 8 illustrate performance of blocking operations on laminated sheets by means of bars which are configured to maintained laminated sheet material substantially planar during the blocking operations.

DETAILED DESCRIPTION OF THE INVENTION

Figure 1:
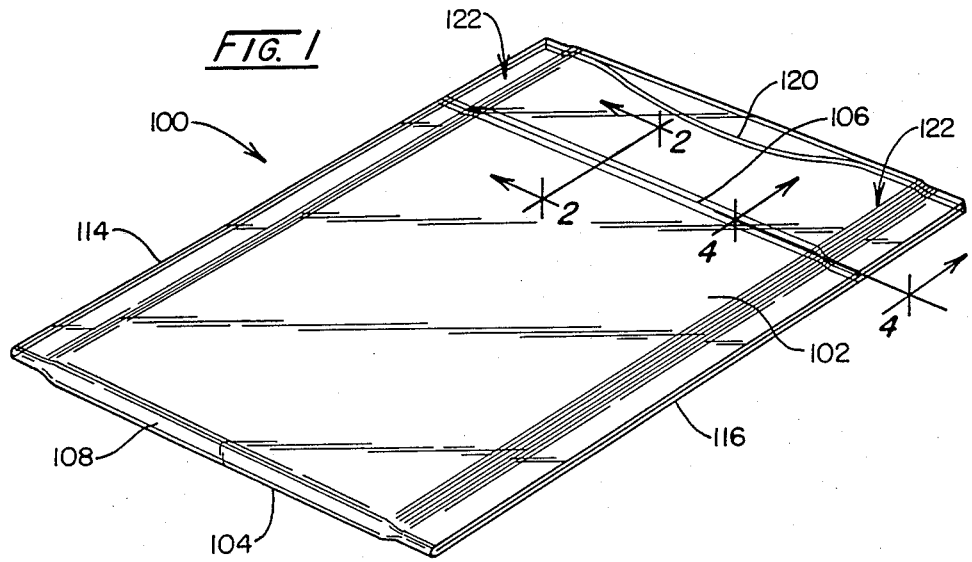
FIG. 1 is a perspective view of a plastic bag formed from laminated sheet material including plies of thermoplastic material.
Figure 2:
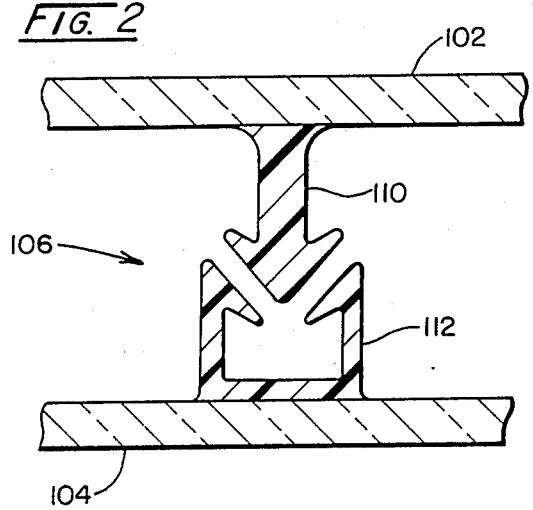
FIG. 2 is a cross-sectional view taken along the line 2—2 in FIG. 1 illustrating in detail one zipper closure formation.

Illustrated in perspective view in FIG. 1 is a plastic bag 100 formed from flexible laminated sheet material as disclosed, for example, in U.S. patent application Ser. No. 868,824 filed May 29, 1986 for Antistatic Sheet Material, Package and Method of Making which application is assigned to the same assignee as the present application and is incorporated herein by reference. The bag 100 includes two opposing walls 102 and 104 which comprise a laminated multilayer flexible sheet material as described in the referenced patent application and as will be further described below. The bag 100 is formed by applying zipper closure 106 to a web of the flexible laminated sheet material and folding the web of material upon itself at fold line 108 to bring complimentary rib and groove elements 110 and 112 into alignment as shown in FIGS. 1 and 2 to form the closure 106. Opposing edges 114 and 116 are then sealed together in accordance with the present invention and the bag 100 severed from the web by a guillotine cut-off knife 118 shown in FIGS. 3 and 6.

As schematically illustrated in FIG. 2, the zipper closure 106, adjacent opening 120, comprises an interlocking zipper having complimentary rib and groove elements 110 and 112, respectively. While single rib and groove elements have been illustrated for simplicity, it will be apparent to those skilled in the art that other structures such as so-called Wide Track zippers with a plurality of complimentary rib and groove elements may be used. Preferably the zipper closure 106 is extruded or laminated onto the sheet material prior to the formation of the bag 100 and an antistatic material and/or semiconductive material is incorporated into the zipper closure 106.

During preliminary manufacturing operations, it was discovered that weak side seals were developing in bags formed from laminated sheet materials, particularly around the zipper closure portions of the bags. To overcome these problems, higher temperatures and pressures were used in existing sealing equipment shown schematically in FIG. 3. While the use of higher temperatures and pressures added to the strength of the side seals in the bags formed from laminated sheet material, it was discovered that the plies adjacent the zipper closure portions of the bags and extending upwardly to the top of the bags as indicated at 122 in FIG. 1, tended to delaminate from the other plies.

A cross-section of the bag area including delamination is shown in FIG. 4. The laminated sheet material includes an outer layer 126 of metallized polyester, the upper layer of which has become delaminated in FIG. 4. The metallized polyester layer 126 is secured to an inner layer 128 of low density polyethylene by means of a layer of adhesive 130. A layer of antistatic material may be coated onto the low density polyethylene before the adhesive layer 130 is applied. For example, an antistatic layer may comprise an acrylate monomer-oligomer mixture containing an alkylether triethyl ammonium sulfate availble from Metallized Products, Inc., Winchester, Mass., under the name STATICURE.

As shown in FIG. 3, a folded section of laminated sheet material 132 is passed through a series of rollers 134 including a tension control roller 136 to a first pair of heated seal bars 138. In the prior sealing arrangement of FIG. 3, the seal bars 138A and 138B are heated to a temperature of 180° C. The heated seal bars 138 serve to seal the zipper closure portions of the bags 100 which then pass to heated seal bars 140.

The heated seal bars 140 include Teflon (polytetrafluoroethylene) sheets 142 and a silicone mat 144 on the bottom seal bar 140B with the top seal bar 140A being heated to a temperature of 290° C. and the bottom seal bar 140B being heated to a temperature of 110° C. The second pair of seal bars 140 provide a soft pressure and noted heat to seal the remaining portion of the side seals of the bags. The sealed portions of the laminated sheet material 132 are then passed to a pair of cooling bars 146 with the upper bar 146A having a silicone mat 148 and both of the cooling bars 146 having a textured Teflon sheet 150 positioned adjacent the laminated sheet material 132. The bags then pass to a guillotine cut-off knife 118 by means of drawing rollers 152. While the bag sealing and severing arrangement shown in FIG. 3 as described above provided improved side seals in the bags, it led to the delamination of the laminated sheet material 132 as shown in FIG. 4.

It has been discovered that delamination of the laminated sheet material 132 was caused by the high temperatures of the seal bars 138 and 140 and the seal bar configurations as shown on an enlarged scale in FIG. 5. While FIG. 5 is directed to the seal bars 140 of FIG. 3, it is apparent that the lower seal bars 138B and 140B and the lower cooling bar 146B all lead to the laminated sheet material 132 and, particularly the zipper closure portion thereof adjacent to the seal, being forced to bend upwardly out of the way of the lower flat bar. This upward bending under conditions of applied heat and pressure is believed to contribute to adhesive failure resulting in the delamination shown in FIG. 4.

By using pairs of seal and cooling bars or blocking bars which have an effectively matched cross-section, the laminated sheet material 132 is maintained substantially planar during the blocking operations. Replacement of the bars 138, 140, 146 of FIG. 3 result in the configuration of equipment for sealing the packaging bags constructed from laminated sheet material in accordance with the process of the present invention as shown in FIG. 6.

By replacing the bottom seal bar 138B with a seal bar 138C which has a matched cross-section, i.e., a mirror image of the top seal bar 138A, the application of heat and pressure through seal bars 138A and 138C maintains the laminated sheet material 132 substantially planar during the first blocking operation.

The bottom seal bar 140B is similarly replaced by a seal bar 140C which has an effectively matched cross-section to the seal bar 140A. The seal bars 140A and 140C are preferably rounded at their leading and trailing edges and, as shown in FIG. 6, the bottom sealing bar 140C is covered by a silicone sheet 154 with the radii of the rounded leading and trailing edges of the bars 140A, 140C and the thickness of the silicone sheet 154 being coordinated such that the effective cross-sections of the bars are matched. The provision of the silicone sheet 154 is a preferred arrangement for applying a soft pressure during the second blocking operation performed by the seal bars 140A and 140C which serves to seal the remainder of the areas of the laminated sheets and secondarily seal the zipper closure portions thereof.

To complete the conversion of the apparatus of FIG. 3 to operate in accordance with the process of the present invention, the upper and lower cooling bars 146A and 146B are replaced by a pair of matched cross-section cooling bars 146C and 146D such that a cooling blocking operation performed on the laminated sheet material 132 maintains the laminated sheet material 132 substantially planar.

In addition to the modifications made to the blocking bars of the system shown in FIG. 6, it has been determined that satisfactory seals on the order of 4-4.5 pounds per inch side seam strength per ASTM D-1876 test method can be produced, and delamination can be substantially, if not entirely, eliminated by lowering the seal bar temperatures such that preferably seal bars 138A and 138C are operated at 165° C. while seal bar 140A is operated at a temperature of 270° C. and seal bar 140C is operated at a temperature of 110° C.

Accordingly, a process for sealing thermoplastic material included in laminated sheets having thickened sections resulting from the presence of zipper closures comprises first preblocking the laminated sheets by the application of heat and pressure through a pair of seal bars configured to maintain the laminated sheets substantially planar during the first blocking operation, for example, by having seal bars which are matched in cross-section or mirror images of one another, with the seal bars for the first blocking operation engaging areas of the sheets to be sealed including zipper closure portions and preblock the remainder of the areas. Next, a second blocking operation is performed over the previously blocked areas of the laminated sheets by the application of heat and a soft pressure through a pair of seal bars configured, once again, to maintain the laminated sheets substantially planar during the second blocking operation to seal the remainder of the areas and secondarily seal the zipper closure portions. Finally, a cooling blocking operation is performed over the previously blocked areas of the laminated sheets by the pressure application of a pair of cooling bars configured to maintain the laminated sheets substantially planar during the cooling blocking operation. While the temperature for the seal bars of the first blocking operation have been indicated preferably as 165° C., the temperature can vary over a range of 140°–175° C.

Having described the invention in detail and by reference to preferred embodiments thereof, it will be apparent that modifications and variations are possible without departing from the scope of the invention defined in the appended claims.

What is claimed is:

1. A process for sealing plies of thermoplastic material included in laminated sheets having thickened sections resulting from the presence of zipper closures, said process comprising the steps of:
    (a) performing a first blocking operation on said laminated sheets by the application of heat and pressure through a pair of seal bars configured to maintain said laminated sheets substantially planar during said first blocking operation, said bars engaging areas of said sheets to be sealed including zipper closure portions thereof to preliminarily seal said zipper closure portions and preblock the remainder of said areas;
    (b) performing a second blocking operation over the previously blocked areas of said laminated sheets by the application of heat and a soft pressure through a pair of seal bars configured to maintain said laminated sheets substantially planar during said second blocking operation to seal the remainder of said areas and secondarily seal said zipper closure portions; and
    (c) performing a final cooling blocking operation over the previously blocked areas of said laminated sheets by the pressure application of a pair of cooling bars configured to maintain said laminated sheets substantially planar during said cooling blocking operation.

2. The process of claim 1 wherein said first blocking operation is performed at a temperature ranging from 140°–175° C.

3. The process of claim 1 wherein said pairs of blocking bars have an effectively matched cross section.

4. The process of claim 3 wherein the blocking bars for performing said second blocking operation are rounded at their leading and trailing edges and at least one of said bars is covered by a silicone sheet with the radii of said rounded leading and trailing edges of said bars and the thickness of said silicone sheet being coordinated such that the effective cross sections of said bars are matched.

5. A process for sealing plies of thermoplastic material included in laminated sheets having thickened sections resulting from the presence of zipper closures, said process comprising the steps of:
    (a) performing a first blocking operation on said laminated sheets by the application of heat and pressure through a pair of seal bars having an effectively matched cross section, said bars engaging areas of said sheets to be sealed including zipper closure portions thereof to preliminarily seal said zipper closure portions and preheat the remainder of said areas;
    (b) performing a second blocking operation over the previously blocked areas of said laminated sheets by the application of heat and a soft pressure through a pair of seal bars having an effectively matched cross section to seal the remainder of said areas and secondarily seal said zipper closure portions; and (c) performing a final cooling blocking operation over the previously blocked areas of said laminated sheets by the pressure application of a pair of cooling bars having an effectively matched cross section.

6. The process of claim 5 wherein said first blocking operation is performed at temperature ranging from 140°-175° C.

7. Apparatus for sealing plies of thermoplastic material included in laminated sheets having thickened sections resulting from the presence of zipper closures, said apparatus comprising:

(a) first means for performing a first blocking operation on said laminated sheets by the application of heat and pressure through a pair of seal bars configured to maintain said laminated sheets substantially planar during said first blocking operation, said bars engaging areas of said sheets to be sealed including zipper closure portions thereof to preliminarily seal said zipper closure portions and preblock the remainder of said areas;

(b) second means for performing a second blocking operation over the previously blocked areas of said laminated sheets by the application of heat and a soft pressure through a pair of seal bars configured to maintain said laminated sheets substantially planar during said second blocking operation to seal the remainder of said areas and secondarily seal said zipper closure portions; and (c) third means for performing a final cooling blocking operation over the previously blocked areas of said laminated sheets by the pressure application of a pair of cooling bars configured to maintain said laminated sheets substantially planar during said cooling blocking operation.

8. The apparatus of claim 7 wherein said first blocking operation is performed at a temperature ranging from 140°-175° C.

9. The apparatus of claim 7 wherein said pairs of blocking bars have an effectively matched cross section.

10. The apparatus of claim 9 wherein the blocking bars for performing said second blocking operation are rounded at their leading and trailing edges and at least one of said bars is covered by a silicone sheet with the radii of said rounded leading and trailing edges of said bars and the thickness of said silicone sheet being coordinated such that the effective cross sections of said bars are matched.

* * * * *

UNITED STATES PATENT AND TRADEMARK OFFICE
CERTIFICATE OF CORRECTION

PATENT NO. : 4,927,474

DATED : May 22, 1990

INVENTOR(S) : James C. Pawloski

It is certified that error appears in the above-identified patent and that said Letters Patent is hereby corrected as shown below:

Column 1, line 24, "of" should correctly read --or--.

Column 2, line 56, "he" should correctly read --the--.

Column 3, line 28, "maintained" should correctly read --maintain--.

Column 5, line 55, following "portions" insert --thereof to preliminarily seal the zipper closure portions--.

Signed and Sealed this

Third Day of March, 1992

*Attest:*

HARRY F. MANBECK, JR.

*Attesting Officer*      *Commissioner of Patents and Trademarks*